(12) United States Patent
Rinne et al.

(10) Patent No.: US 9,283,571 B2
(45) Date of Patent: *Mar. 15, 2016

(54) METHOD OF USING A FLOTATION MACHINE THAT IS USED IN METALLURGICAL PROCESSES AND A FLOTATION MACHINE

(71) Applicant: OUTOTEC OYJ, Espoo (FI)

(72) Inventors: Antti Rinne, Espoo (FI); Kari Saloheimo, Espoo (FI)

(73) Assignee: Outotec Oyj, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,734

(22) Filed: May 5, 2015

(65) Prior Publication Data

US 2015/0231646 A1 Aug. 20, 2015

Related U.S. Application Data

(63) Continuation of application No. 13/825,746, filed as application No. PCT/FI2011/050831 on Sep. 26, 2011, now Pat. No. 9,079,192.

(30) Foreign Application Priority Data

Sep. 29, 2010 (FI) ...................................... 20106006

(51) Int. Cl.
*B03D 1/02* (2006.01)
*B03D 1/16* (2006.01)

(52) U.S. Cl.
CPC *B03D 1/02* (2013.01); *B03D 1/028* (2013.01); *B03D 1/16* (2013.01)

(58) Field of Classification Search
None
See application file for complete search history.

(56) References Cited

U.S. PATENT DOCUMENTS 6,991,111 B2 1/2006 Lilja et al.

FOREIGN PATENT DOCUMENTS

| FI | 116042 B1 | 9/2005 |
| WO | 03008959 A1 | 1/2003 |

OTHER PUBLICATIONS

Finnish Search Report for patent application No. 20106006, issued Apr. 7, 2011, 1 page.

(Continued)

*Primary Examiner* — Thomas M Lithgow
(74) *Attorney, Agent, or Firm* — Chernoff, Vilhauer, McClung & Stenzel, LLP

(57) ABSTRACT

The invention relates to a method of using a flotation machine that is used in metallurgical processes and to a flotation machine. The flotation machine foams hydrophobic particles from an aqueous slurry that contains these particles. The flotation machine includes a flotation cell (1), and a rotor (2) that is inside the flotation cell. The rotor (2) is rotated at a mixing power, which maintains the suspension in the slurry and mixing of air with the slurry to form the foam, and the mixing power is controlled by adjusting the rotation speed of the rotor. The amount of solid matter S accumulated on the bottom of the cell (1) is determined, and the rotation speed of the rotor (2) is adjusted on the basis of the determined amount of solid matter. The flotation machine includes a measuring device (5) for determining the amount of solid matter accumulated on the bottom of the cell. The adjusting device (4) is arranged to adjust the rotation speed of the motor (3), which rotates the rotor (2), on the basis of the measuring result of the measuring device (5) to remove the solid matter from the bottom of the cell.

6 Claims, 1 Drawing Sheet

(56) References Cited

OTHER PUBLICATIONS

A.P. Van Der Westhuizen & D.A. Deglon, "Evaluation of solids suspension in a pilot-scale mechanical flotation cell: The critical impeller speed," Minerals Engineering 20 (2007) pp. 233-240.

Heinrich Schubert & Claus Bischofberger, "On the Hydrodynamics of Flotation Machines," International Journal of Mineral Processing, 5 (1978) pp. 131-142, Elsevier Scientific Publishing Company, Amsterdam.

B.J. Shean, J.J. Cilliers, "A review of froth flotation control," International Journal of Mineral Processing 100 (2011) pp. 57-71.

N. Arbiter, C. C. Harris, & R. F. Yap, "Hydrodynamics of Flotation Cells," Society of Mining Engineers, AIME, Transactions vol. 244 Mar. 1969.

Nathaniel Arbiter & Colin C. Harris "Chapter 14: Flotation Machines," Jan. 1, 1962, Froth Flotation:50, Anniversary Volume, Society of Mining Engineers, 18 pages.

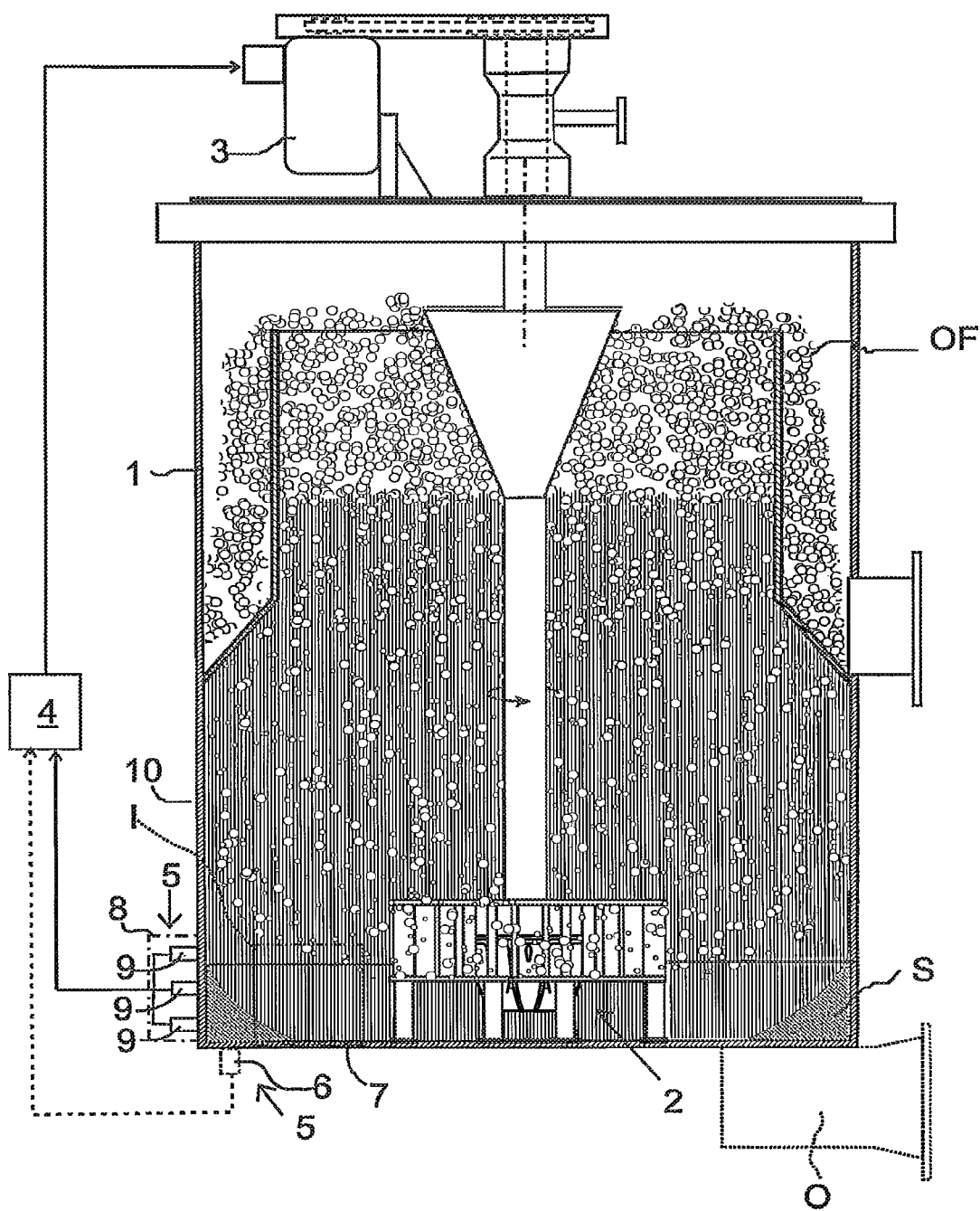

METHOD OF USING A FLOTATION MACHINE THAT IS USED IN METALLURGICAL PROCESSES AND A FLOTATION MACHINE

CROSS-REFERENCE TO RELATED APPLICATIONS

This application is a continuation of, and claims the benefit of priority to, U.S. application Ser. No. 13/825,746 filed on Mar. 22, 2013, which is a national stage application filed under 35 U.S.C. §371 and claiming the benefit of priority to PCT/FI11/50831 filed on Sep. 26, 2011, which in turn claims the benefit of priority to Finnish Application No. 20106006 filed on Sep. 29, 2010.

FIELD OF THE INVENTION

The invention relates to a method defined in the preamble of claim 1. The invention further relates to a flotation machine defined in the preamble of claim 5.

BACKGROUND OF THE INVENTION

In well-known metallurgical flotation methods and flotation machines, particles that are rendered hydrophobic are foamed from an aqueous slurry that contains these particles. The flotation machine includes a flotation cell and a rotor that is inside the flotation cell. The rotor is rotated at a mixing power, which maintains a suspension in the slurry and the mixing of air with the slurry, to form the foam. It is further known that the mixing power can be adjusted by adjusting the rotation speed of the rotor. An electric motor is normally arranged to rotate the rotor, and the rotation speed of the motor can be changed by means of a frequency converter that serves as an adjusting device.

When using the flotation machine, so-called sanding occurs; that is, solid matter accumulates on the bottom of the flotation cell, in the corner region between the bottom and the wall. Excessive accumulation of solid matter is not allowed, because the solid matter thus accumulated tends to block the inlet and outlet openings of slurry that are usually located in the area of accumulation.

In prior art, the matter has been solved in a simple way by selecting "an adequate amount" of mixing power; in other words, the rotor is rotated continuously at a high enough rotation speed, at which the solid matter does not accumulate excessively. This has often resulted in considerable excess power with respect to what is needed and, at the same time, in poor energy efficiency.

It has been observed that, in many cases, the metallurgical results do not deteriorate, even if the mixing power is reduced, but at some stage, a limiting factor of reducing the mixing power will consist of the excessive accumulation of solid matter, or sanding, on the bottom of the cell.

The energy efficiency is a very significant matter in flotation plants. For example, in a flotation plant, there can be 50 flotation machines in a series, each having a 300 kW electric motor. When each of them is continuously operated with excess power to prevent sanding, we are talking about a considerable item of expenditure.

OBJECT OF THE INVENTION

The object of the invention is to eliminate the disadvantages mentioned above.

In particular, the object of the invention is to disclose a method of operating a flotation machine and a flotation machine, by means of which the problems caused by the accumulation of solid matter are avoided and, at the same time, the operation of the flotation machine becomes as energy-effective as possible.

SUMMARY OF THE INVENTION

The method according to the invention is characterized in what is disclosed in claim 1. The flotation machine according to the invention is characterized in what is disclosed in claim 5.

According to the invention, in the method, the amount of solid matter accumulated on the bottom of the cell is determined, and the rotation speed of the rotor is adjusted on the basis of the measured amount of solid matter.

Correspondingly, according to the invention, the flotation machine includes a measuring device for determining the amount of solid matter accumulated on the bottom of the cell. The adjusting device is arranged to adjust the rotation speed of the motor on the basis of the measuring results of the measuring device to remove the solid matter from the bottom of the cell.

The invention is based on the remarkable observation that when the amount of accumulated solids is observed and the mixing power is adjusted accordingly in a controlled manner, the mixing power can even be halved, without the metallurgical result weakening, from the continuous mixing power, which at present is required to keep the accumulation of solid matter on the bottom of the cell at the minimum. By means of the invention, the energy efficiency of the flotation can be considerably improved and significant cost savings can be achieved. The mixing power can also be optimized in real time regarding the sanding, whereby the energy efficiency of the flotation machine can be optimized in its entirety.

In an embodiment of the method, the rotation speed of the rotor is continuously kept at the lowest possible standard value, at which the determined amount of solid matter accumulated on the bottom of the cell will not exceed a predetermined limit value.

In an embodiment of the method, the rotor is rotated at the lowest possible first rotation speed which, in terms of metallurgy, is selected so as to have an adequate mixing power to maintain the suspension and form the foam and, at the same time, to be small enough to allow the accumulation of solid matter on the bottom of the cell. The amount of solid matter accumulated on the bottom of the cell is further determined. The determined amount of solid matter is compared with a predetermined limit value. If the determined amount of solid matter exceeds the predetermined limit value, the rotation speed of the rotor is increased to a second rotation speed, which is higher than the first rotation speed and which is adequate to remove the solid matter that is accumulated on the bottom of the cell. The second rotation speed is maintained so long that the amount of solid matter is below the predetermined limit value, and the rotation speed can again be reduced to the lower first rotation speed.

It is, indeed, preferable to allow a minor accumulation of solid matter, because the layer of solid matter functions as an autogenous protective layer that protects the bottom against wearing. Thus, it is not necessary to protect the bottom, for example, with paint or the like.

In an embodiment of the method, the rotor is rotated at the lowest possible first rotation speed which, in terms of metallurgy, is selected so as to have an adequate mixing power to maintain the suspension and form the foam and, at the same time, to be small enough to allow the accumulation of solid matter on the bottom of the cell. The rotation speed of the rotor is periodically or randomly increased from the first rotation speed to the higher second rotation speed to remove the solid matter accumulated on the bottom of the cell. The second rotation speed is maintained for a predetermined period of time, after which the rotation speed of the rotor is reduced to the said first rotation speed.

In an embodiment of the flotation machine, the measuring device is one that is based on the echo sounding of the surface of the solid matter. The measuring device that is based on echo sounding can be, for example, an ultrasonic radar. The ultrasonic radar is preferably placed on the bottom of the cell.

In an embodiment of the flotation machine, the measuring device includes a sonic detector, which is adapted so as to recognize the sound made by the solid matter that is accumulated on the bottom of a container. The sonic detector can comprise, for example, microphones which are placed on the wall of the cell at different heights with respect to the bottom, corresponding to the predetermined limit values of the level of the solid matter layer.

LIST OF FIGURES

In the following, the invention is described in detail by means of application examples and with reference to the appended drawing, which shows a schematic cross section of an embodiment of the flotation machine, according to the invention.

DETAILED DESCRIPTION OF THE INVENTION

FIG. 1 shows an embodiment of the flotation machine. The invention is, however, not limited to the flotation machine according to the FIGURE. The flotation machine includes a flotation cell 1. The flotation cell 1 has a mainly cylindrical shape and its interior is limited below by a bottom 7 and on the side by a side wall 10. A rotor 2 is centrally arranged inside the flotation cell in the vicinity of bottom 7. The rotor 2 comprises air distribution holes, through which air is distributed into the slurry during mixing to form foam in the slurry, when the rotor rotates around its vertical axis. The rotor 2 is rotated by an electric motor 3. The rotation speed of the motor 3 can be changed by means of an adjusting device 4. Slurry is fed into the cell 1 through an inlet I that can be opened and closed (shown by a dotted line in the FIGURE) and removed through an outlet O that can be opened and closed (shown by a dotted line in the FIGURE). Foam and the substances to be recovered that are stuck thereto exit through an overflow OF.

Furthermore, the flotation machine includes a measuring device 5 for determining the amount of solid matter accumulated on the bottom of the cell. The adjusting device 4 is arranged to adjust the rotation speed of the motor 3 on the basis of the measuring result of the measuring device 5 to remove the solid matter S from the bottom of the cell.

In the FIGURE, an embodiment of the measuring device 5 is outlined by a dashed line, being herein a measuring device 6 that is based on the echo sounding of the surface of the solid matter. It can be, for example, an ultrasonic radar 6. The ultrasonic radar 6 is placed on the bottom 7 of the cell 1 on the outside, or it can penetrate the bottom. The ultrasonic radar 6 can measure the level, on which the solid matter surface is situated.

Another example of the measuring device 5 in the FIGURE is the sonic detector 8 that is drawn by a dot-and-dash line and adapted so as to recognize the sound caused by the solid matter that is accumulated on the bottom of the container, the sound being created by the solid matter flow rubbing against the side wall 10 of the cell. The sonic detector 8 can include several microphones 9, which are placed on the wall 10 of the cell at different heights with respect to the bottom 7, corresponding to the predetermined limit values of the level of the solid matter layer. The velocity profile of the flow inside the cell 1 can also be calculated from an acoustic correlation, when so desired.

The equipment mentioned above is used so that the amount of solid matter accumulated on the bottom of the cell is determined by the measuring device 5. The measuring device 5 delivers a signal related to the amount of solid matter to the adjusting device 4, which adjusts the rotation speed of the motor 3 that drives the rotor 2, on the basis of the determined amount of solid matter accumulated on the bottom.

The mixing power can be controlled, for example, so that the rotation speed of the rotor 2 is continuously kept at the lowest possible standard value, at which the determined amount of solid matter S accumulated on the bottom 7 of the cell will not exceed the predetermined limit value.

The mixing power can also be controlled, for example, so that the rotor 2 is rotated at the lowest possible first rotation speed which, in terms of metallurgy, is selected so as to have an adequate mixing power to maintain the suspension and form the foam and, at the same time, to be small enough to allow the accumulation of solid matter S on the bottom of the cell 1. The amount of solid matter accumulated on the bottom 7 of the cell 1 is determined and the determined amount of solid matter S is compared with a predetermined limit value. If the determined amount of solid matter S exceeds the predetermined limit value, the rotation speed of the rotor 2 is increased to the second rotation speed, which is higher than the first rotation speed and which is adequate to remove the solid matter that is accumulated on the bottom of the cell. The second rotation speed is maintained until the amount of solid matter is below the predetermined limit value and, finally, the rotation speed is reduced to the first rotation speed and kept at that, until the determined amount of solid matter S again exceeds the predetermined limit value.

The equipment can also be used so that the rotor 2 is rotated at the lowest possible first rotation speed which, in terms of metallurgy, is selected so as to have an adequate mixing power to maintain the suspension and form the foam and, at the same time, to be small enough to allow the accumulation of solid matter on the bottom of the cell. The rotation speed of the rotor 2 is increased randomly or periodically (for example, once in an hour, once in 24 hours) from the first rotation speed to the higher second rotation speed to remove the solid matter S accumulated on the bottom of the cell, and the second rotation speed is maintained for a predetermined period of time, after which the rotation speed of the rotor is reduced to the said first rotation speed.

The invention is not limited to the application examples described above only, but many modifications are possible within the inventive idea defined by the claims.

The invention claimed is:

1. A method of using a flotation machine in metallurgical processes, the flotation machine foaming hydrophobic particles from within an aqueous slurry, the flotation machine including a rotor inside a flotation cell and rotated at a variable speed to provide a controllable mixing power that maintains a suspension in the slurry and mixes air with the slurry to form foam, the method comprising the steps of:

rotating the rotor at a first rotation speed, which is the lowest possible rotation speed that has an adequate mixing power to maintain a suspension and form foam while simultaneously allowing solid matter to accumulate on the bottom of the cell;

thereafter, increasing the rotation speed of the rotor to a second rotation speed sufficient to remove the solid matter accumulated on the bottom of the cell; and maintaining the second rotation speed for a predetermined period of time, after which the rotation speed of the rotor is reduced to the first rotation speed.

2. The method of claim 1 including a step of determining the amount of solid matter accumulated at the bottom of the cell.

3. The method of claim 2 where the step of determining the amount of solid matter accumulated at the bottom of the cell is based on an echo sounding of the surface of the solid matter.

4. The method of claim 3 where the echo sounding is performed by an ultrasonic radar.

5. The method of claim 4 where the ultrasonic radar is placed on the bottom of the flotation cell.

6. The method of claim 2 where the step of determining the amount of solid matter accumulated at the bottom of the cell is performed by a sonic detector adapted to recognize the sound caused by the accumulated solid matter.

\* \* \* \* \*